United States Patent
Ota et al.

(10) Patent No.: US 10,866,160 B2
(45) Date of Patent: Dec. 15, 2020

(54) MISFIRE DETERMINATION APPARATUS

(71) Applicant: SUBARU CORPORATION, Tokyo (JP)

(72) Inventors: Mao Ota, Tokyo (JP); Tatsuya Ichikawa, Tokyo (JP); Daiki Shiwa, Tokyo (JP); Masaya Kajii, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 192 days.

(21) Appl. No.: 16/208,837

(22) Filed: Dec. 4, 2018

(65) Prior Publication Data

US 2019/0293519 A1 Sep. 26, 2019

(30) Foreign Application Priority Data

Mar. 23, 2018 (JP) ................................. 2018-056413

(51) Int. Cl.
*G01M 15/11* (2006.01)
*B60W 10/06* (2006.01)
(Continued)

(52) U.S. Cl.
CPC ............ *G01M 15/11* (2013.01); *B60W 10/06* (2013.01); *B60W 20/15* (2016.01); *B60W 20/50* (2013.01);
(Continued)

(58) Field of Classification Search
CPC ...... G01M 15/11; B60W 10/06; B60W 20/15; B60W 20/50; B60W 2050/022;
(Continued)

(56) References Cited

U.S. PATENT DOCUMENTS 7,292,933 B2 * 11/2007 Christensen ............ G01M 15/11
701/111
7,503,207 B2 * 3/2009 Nishigaki .............. G01M 15/11
73/114.02
(Continued)

FOREIGN PATENT DOCUMENTS

| JP | 2010-242616 A | 10/2010 |
|---|---|---|
| JP | 2015-174492 A | 10/2015 |
| JP | 2017-105332 A | 6/2017 |

OTHER PUBLICATIONS

Japanese Office Action, dated Aug. 6, 2019, in Japanese Application No. 2018-056413 and English Translation thereof.

*Primary Examiner* — Freddie Kirkland, III
(74) *Attorney, Agent, or Firm* — McGinn IP Law Group, PLLC.

(57) ABSTRACT

A misfire determination apparatus includes first to third obtaining units, a calculator, and a determination unit. The first obtaining unit is configured to obtain actual engine rotation number of an engine. The engine is coupled, via a torsion element, to side of an axle coupled to an electric motor in a torque transmittable manner. The second obtaining unit is configured to obtain motor rotation number of the electric motor. The calculator is configured to calculate calculated engine rotation number of the engine on the basis of the motor rotation number and a total gear ratio between the electric motor and the engine. The third obtaining unit is configured to obtain a rotation deviation between the actual and the calculated engine rotation numbers. The determination unit is configured to execute misfire determination of the engine by determining the engine as being misfiring when the rotation deviation exceeds a determination threshold.

16 Claims, 5 Drawing Sheets

(51) Int. Cl.
*B60W 20/15* (2016.01)
*B60W 20/50* (2016.01)
*F02D 41/22* (2006.01)

(52) U.S. Cl.
CPC ...... *F02D 41/22* (2013.01); *F02D 2200/1015* (2013.01)

(58) Field of Classification Search
CPC ... B60W 2510/0638; B60W 2510/081; B60W 2510/0676; B60W 50/045; F02D 41/22; F02D 2200/1015; F02D 41/0097; B60K 6/445
See application file for complete search history.

(56) References Cited

U.S. PATENT DOCUMENTS

| | | | | |
|---|---|---|---|---|
| 7,849,733 | B2* | 12/2010 | Suzuki | G01M 15/11 73/114.04 |
| 10,029,692 | B2* | 7/2018 | Nakoji | B60W 30/186 |
| 10,358,992 | B2* | 7/2019 | Sugimoto | F02D 41/2451 |
| 2017/0037800 | A1* | 2/2017 | Sugimoto | F02D 41/0225 |

* cited by examiner

MISFIRE DETERMINATION APPARATUS

CROSS-REFERENCE TO RELATED APPLICATIONS

The present application claims priority from Japanese Patent Application No. 2018-056413 filed on Mar. 23, 2018, the entire contents of which are hereby incorporated by reference.

BACKGROUND

The technology relates to a misfire determination apparatus. In particular, the technology relates to a misfire determination apparatus that determines misfire of an engine of a hybrid electric vehicle with the engine and an electric motor mounted thereon as drive force sources.

A misfire determination of an engine has been performed to prevent deterioration of exhaust emissions caused by misfire of an engine. In such a situation, recently, a hybrid electric vehicle (HEV) and a plug-in hybrid electric vehicle (PHEV) have been developed and have been widely used. The HEV and the PHEV use an engine and an electric motor in combination, thereby having an effectively improved fuel consumption rate.

Typically, misfire determination of an engine is performed by comparing engine rotation speeds of respective ignition cycles, that is, on the basis of variation in rotation of an engine. However, accurate determination of misfire of an engine can be difficult, for example, in a hybrid electric vehicle with an engine that is coupled to axle side via a torsion element such as a damper. This is because torsion of the torsion element affects variation in rotation of the engine. In particular, resonance that is produced by the torsion element or any other element may cause vibration in rotation of the engine and may make it difficult to distinguish and determine normal combustion and misfire.

Japanese Unexamined Patent Application Publication (JP-A) No. 2015-174492 discloses a misfire determination system that determines misfire of an engine in consideration of an influence of resonance produced by a torsion element or any other element.

In more detail, this misfire determination system measures a front-stage time on the basis of a synchronization signal by using an EFI-ECU. The front-stage time is a time of detecting number of rotation of a front-stage shaft, which is number Ne of rotation of an engine. Meanwhile, an HV-ECU sets a motor time, which is measured on the basis of a synchronization signal, as a rear-stage time. The rear-stage time is a time of calculating number of rotation of a rear-stage shaft, which is number Nd of rotation of an input shaft. The EFI-ECU acquires the number Nd of rotation of the input shaft and the rear-stage time from the HV-ECU via a communication line. Further, the EFI-ECU calculates an affecting component Nde of resonance on the basis of the number Ne of rotation of the engine and the number Nd of rotation of the input shaft respectively at the front-stage time and the rear-stage time which are closest to each other. The affecting component Nde of resonance is a component by which the resonance affects the number Ne of rotation of the engine. The affecting component Nde of resonance is subtracted from the number Ne of rotation of the engine, and the result is used as number of rotation for detection. The misfire determination of the engine is performed on the basis of the number of rotation for the detection.

SUMMARY

An aspect of the technology provides a misfire determination apparatus that includes a first obtaining unit, a second obtaining unit, a calculator, a third obtaining unit, and a determination unit. The first obtaining unit is configured to obtain actual engine rotation number. The actual engine rotation number is actual number of rotation of an engine in a hybrid electric vehicle. The engine is coupled to side of an axle via a torsion element in the hybrid electric vehicle. The axle is coupled to an electric motor in a torque transmittable manner in the hybrid electric vehicle. The second obtaining unit is configured to obtain motor rotation number. The motor rotation number is number of rotation of the electric motor. The calculator is configured to calculate calculated engine rotation number on the basis of the motor rotation number and a total gear ratio between the electric motor and the engine. The calculated engine rotation number is calculated number of the rotation of the engine. The third obtaining unit is configured to obtain a rotation deviation between the actual engine rotation number and the calculated engine rotation number. The determination unit is configured to execute misfire determination of the engine by determining the engine as being misfiring when the rotation deviation exceeds a determination threshold.

An aspect of the technology provides a misfire determination apparatus that includes a first obtaining unit, a second obtaining unit, and circuitry. The first obtaining unit is configured to obtain actual engine rotation number. The actual engine rotation number is actual number of rotation of an engine in a hybrid electric vehicle. The engine is coupled to side of an axle via a torsion element in the hybrid electric vehicle. The axle is coupled to an electric motor in a torque transmittable manner in the hybrid electric vehicle. The second obtaining unit is configured to obtain motor rotation number. The motor rotation number is number of rotation of the electric motor. The circuitry is configured to calculate calculated engine rotation number on the basis of the motor rotation number and a total gear ratio between the electric motor and the engine. The calculated engine rotation number is calculated number of the rotation of the engine. The circuitry is configured to obtain a rotation deviation between the actual engine rotation number and the calculated engine rotation number. The circuitry is configured to execute misfire determination of the engine by determining the engine as being misfiring when the rotation deviation exceeds a determination threshold.

DETAILED DESCRIPTION

Figure 1:
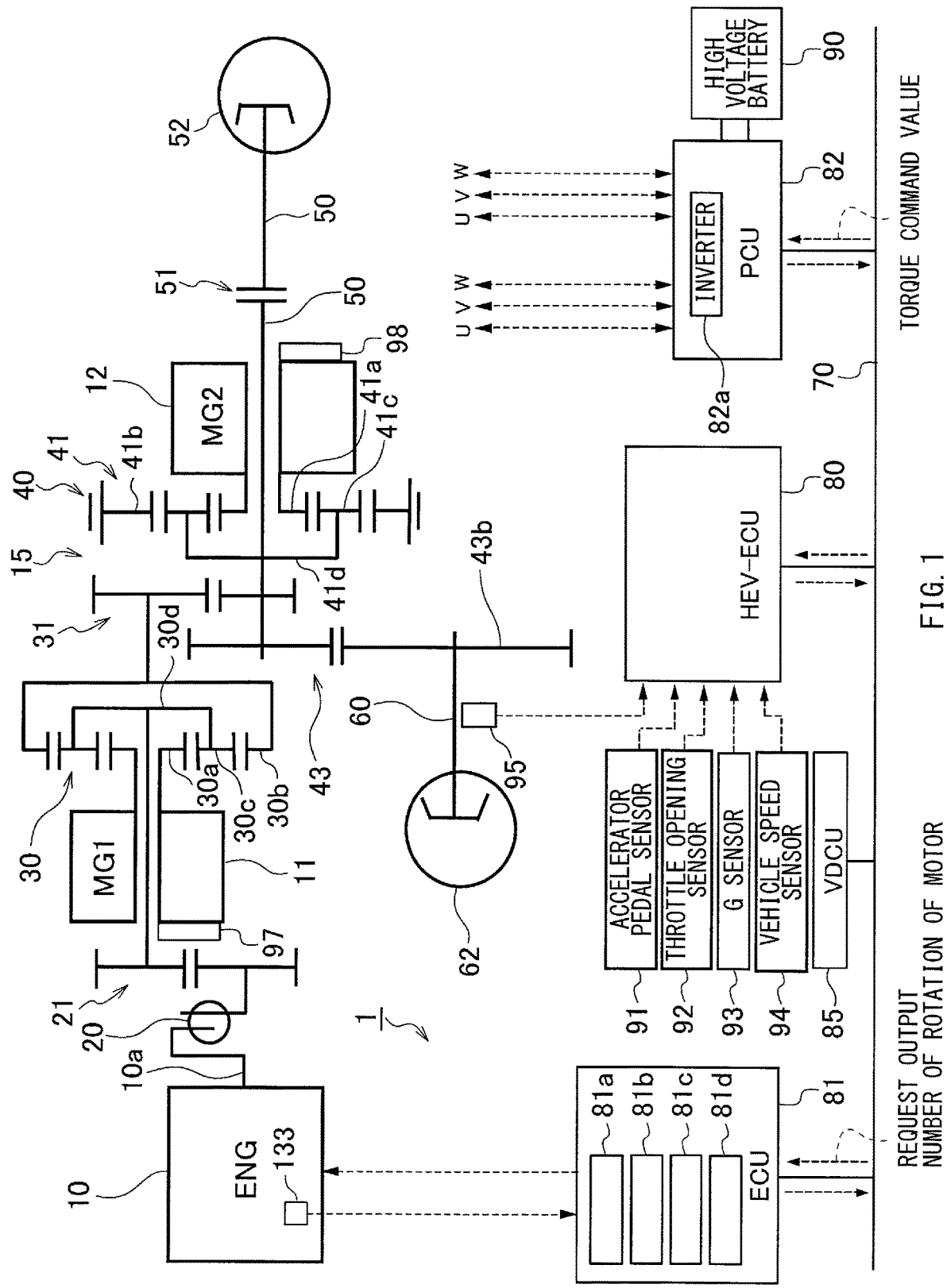
FIG. 1 includes a skeleton diagram illustrating an example of a configuration of a power unit of a hybrid electric vehicle mounted with a misfire determination apparatus according to one implementation of the technology, and a block diagram illustrating an example of a configuration of a control system for the power unit.

In the following, some example implementations of the technology are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a ratio between the elements, and relative positional relationship between the elements are illustrative only and not to be construed as limiting to the technology. Further, elements in the following example implementations which are not recited in a most-generic independent claim of the disclosure are optional and may be provided on an as-needed basis. Throughout the present specification and the drawings, elements substantially the same as or equivalent to each other are denoted with the same numerals to avoid any redundant description.

A misfire determination system according to JP-A No. 2015-174492 enables determination of a front-stage time and a rear-stage time that are closest to each other even when a delay occurs in acquiring number Ne of rotation of an engine and in acquiring number Nd of rotation of an input shaft. Further, it is possible to perform misfire determination of the engine by using the number Ne of rotation of the engine and the number Nd of rotation of the input shaft respectively at the front-stage time and the rear-stage time which are closest to each other.

However, in this misfire determination system, it is necessary to synchronize the number Ne of rotation of the engine and the number Nd of rotation of the input shaft before calculating the affecting component Nde of resonance. For example, a torsion angle θd is calculated from the number Ne of rotation of the engine and the number Nd of rotation of the input shaft, a noise-containing affecting component Nden of resonance is calculated from the torsion angle θd, and noise is eliminated from the noise-containing affecting component Nden of resonance by using a high-pass filter. It may be necessary to thus obtain the affecting component Nde of resonance. Thereafter, the affecting component Nde of resonance is subtracted from the number Ne of rotation of the engine to obtain the number of rotation for the detection. The misfire determination is performed by using the number of rotation for the detection. These steps can increase the process load necessary for the misfire determination. Furthermore, the misfire determination should be executed per each ignition cycle of respective cylinders, and the process of the misfire determination is executed at a high frequency. Therefore, it is desired to suppress an increase in the process load.

In view of these circumstances, it is desirable to provide a misfire determination apparatus that enables accurate determination of misfire while suppressing an increase in a process load even when a torsion element produces resonance. This misfire determination apparatus determines misfire of an engine in a hybrid electric vehicle with the engine coupled to axle side via the torsion element.

Figure 2:
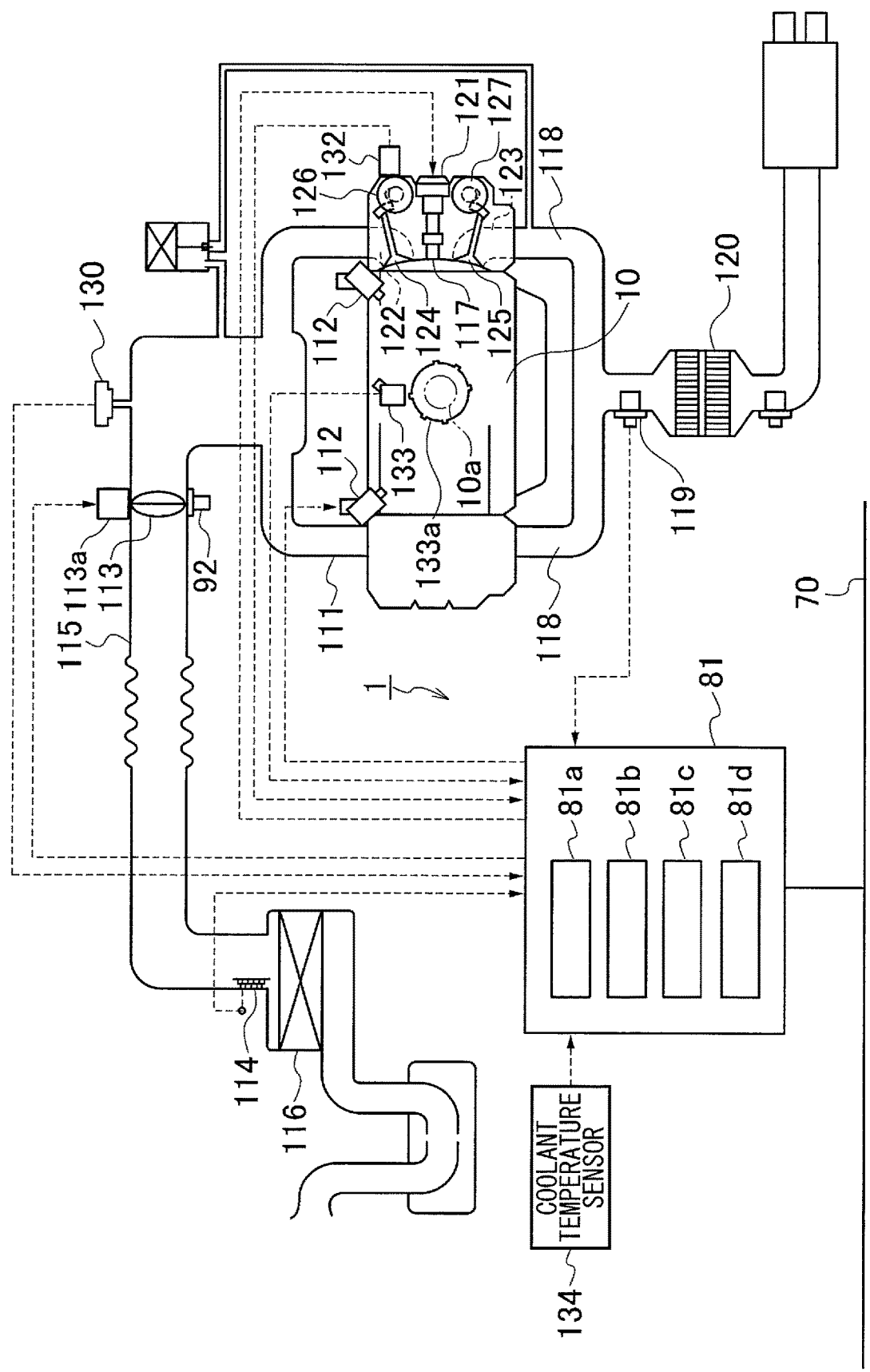
FIG. 2 is a diagram illustrating an example of a configuration of the misfire determination apparatus according to one implementation and an engine applied with the misfire determination apparatus.

A description is given first, with reference to FIGS. 1 and 2, of an example of a configuration of a misfire determination apparatus 1 according to an example implementation of the technology. FIG. 1 includes a skeleton diagram illustrating an example of a configuration of a power unit of a hybrid electric vehicle mounted with the misfire determination apparatus 1. FIG. 1 also includes a block diagram illustrating an example of a configuration of a control system for the power unit. FIG. 2 illustrates an example of a configuration of the misfire determination apparatus 1 and an engine 10 applied with the misfire determination apparatus 1. A description is given below of a case of mounting the misfire determination apparatus 1 on a series-parallel hybrid electric vehicle (HEV), as an example.

First, the configuration of the power unit and other components of the hybrid electric vehicle is described with reference to FIG. 1. Although details of the engine 10 will be described later, the engine 10 may have a crank shaft 10a that is coupled to a power distribution mechanism 30 via a flywheel damper 20 and a pair of gears 21. The flywheel damper 20 may absorb variation in rotation of the engine 10. In one implementation, the flywheel damper 20 may serve as a "torsion element". The power distribution mechanism 30 may be coupled to a drivetrain 15 and a first motor generator (MG) 11. The drivetrain 15 may include components such as multiple gears or a shaft and may transmit torque to drive wheels. In one implementation, the first motor generator 11 may serve as an "electric motor". The power distribution mechanism 30 may include, for example, a planetary gear mechanism including a sun gear 30a, a ring gear 30b, a pinion gear 30c, and a planetary carrier 30d. The power distribution mechanism 30 may divide driving torque that is generated by the engine 10 and may transmit the divided driving torque to each of the drivetrain 15 and the first motor generator 11.

For example, the planetary carrier 30d may be coupled to the crank shaft 10a of the engine 10 via the flywheel damper 20 and the pair of gears 21. The sun gear 30a may be coupled to the first motor generator 11. The ring gear 30b may be coupled to a propeller shaft 50 via a pair of gears 31 and may also be coupled to a front drive shaft 60 via a drive reduction gear 43. The pair of gears 31 may be counter gears, for example. The propeller shaft 50 may be included in the drivetrain 15 and may serve as a rear-wheel output shaft. In one implementation, the propeller shaft 50 may serve as an "axle". The front drive shaft 60 may serve as a front-wheel output shaft. In one implementation, the front drive shaft 60 may serve as the "axle".

When the first motor generator 11 serves as a generator, the power distribution mechanism 30 may receive torque from the engine 10 at the planetary carrier 30d and may distribute the torque to each of the sun gear 30a and the ring gear 30b in accordance with a gear ratio thereof. The torque may be drive force generated by the engine 10. In contrast, when the first motor generator 11 serves as a motor, the power distribution mechanism 30 may receive torque from the engine 10 at the planetary carrier 30d and may also receive torque from the first motor generator 11 at the sun gear 30a. The power distribution mechanism 30 may combine the torque from the engine 10 and the torque from the first motor generator 11, and may output the combined torque to the ring gear 30b. The combined torque that is output to the ring gear 30b may be output to the propeller shaft 50 via the pair of gears 31 and may also be output to the front drive shaft 60 via the drive reduction gear 43. The pair of gears 31 may be counter gears, for example. The propeller shaft 50 may be included in the drivetrain 15.

The drivetrain 15 may also be coupled to a second motor generator (MG) 12. In one implementation, the second motor generator 12 may serve as an "electric motor". For example, the second motor generator 12 may be coupled to the propeller shaft 50 via a motor reduction gear 41. The second motor generator 12 may also be coupled to the front drive shaft 60 via a drive reduction gear mechanism 40 that includes the motor reduction gear 41 and the drive reduction gear 43. The front drive shaft 60 may transmit torque to front wheels. The propeller shaft 50 may transmit torque to rear wheels.

The first motor generator 11 and the second motor generator 12 may be configured as a synchronized generator-motors that serve as a motor that converts supplied electric power into mechanical power and also as a generator that converts received mechanical power into electric power. That is, each of the first motor generator 11 and the second motor generator 12 may operate as a motor that generates driving torque to drive the vehicle and may operate as a generator to perform regeneration. The first motor generator 11 may operate mainly as the generator, and the second motor generator 12 may operate mainly as the motor.

The drive reduction gear mechanism 40 may include the motor reduction gear 41 and the drive reduction gear 43. The motor reduction gear 41 may include a planetary gear. The drive reduction gear 43 may include, for example, a spur gear or a helical gear.

In more detail, the motor reduction gear 41 may include, for example, a planetary gear mechanism including a sun gear 41a, a ring gear 41b, a pinion gear 41c, and a planetary carrier 41d. When the second motor generator 12 serves as a motor, the motor reduction gear 41 may receive torque that is transmitted from the second motor generator 12, decelerate rotation to increase the torque, and output the increased torque from the planetary carrier 41d. In contrast, the motor reduction gear 41 may receive torque, which is drive force input to the planetary carrier 41d, accelerate rotation to decrease the torque, and output the decreased torque from the sun gear 41a, to make the second motor generator 12 serve as a generator.

The front drive shaft 60 may transmit torque between the drive reduction gear mechanism 40 and drive wheels. In the example illustrated in FIG. 1, the drive wheels may be front wheels. In more detail, the torque that is transmitted from the second motor generator 12 or any other device to the front drive shaft 60 may be transmitted to a front differential 62. The front differential 62 may be a bevel gear differential, for example. The torque from the front differential 62 may be transmitted to an unillustrated left front wheel via a left front wheel drive shaft and may also be transmitted to an unillustrated right front wheel via a right front wheel drive shaft.

The propeller shaft 50 may transmit torque to the rear wheels. The propeller shaft 50 may have an interposed transfer clutch 51 that adjusts the torque to be transmitted to the rear wheel side. The transfer clutch 51 may control engagement force, that is, a ratio of distribution of torque to be distributed to the rear wheels, in accordance with a factor such as drive states of the four drive wheels or engine torque. Non-limiting examples of the drive states of the four drive wheels may include a state of slip of the front wheel. Thus, the torque that is transmitted from the second motor generator 12 or any other device to the propeller shaft 50 may be distributed in accordance with the engagement force of the transfer clutch 51 and may be further transmitted to the rear wheel side.

For example, the torque that is transmitted to the propeller shaft 50 and that is adjusted and distributed by the transfer clutch 51 may be thereafter transmitted to a rear differential 52. The rear differential 52 may be coupled to a left rear wheel drive shaft and a right rear wheel drive shaft, which are not illustrated in the drawing. The drive force from the rear differential 52 may be transmitted to an unillustrated left rear wheel via the left rear wheel drive shaft and may also be transmitted to an unillustrated right rear wheel via the right rear wheel drive shaft.

This configuration enables driving the front wheels and the rear wheels of the vehicle by the two powers from the engine 10 and the second motor generator 12 in the vehicle according to this example implementation. The vehicle according to this example implementation may be an all-wheel drive (AWD) hybrid electric vehicle (HEV), for example. In one example, it is also possible to switch EV traveling that uses the power from only the second motor generator 12 and traveling that uses the powers from the engine 10 and the second motor generator 12, depending on traveling conditions. Moreover, it is possible to generate electricity by using the second motor generator 12 or any other device.

The engine 10, the second motor generator 12, and the first motor generator 11, which are drive force sources of the vehicle, may be generally controlled by a hybrid electric vehicle control unit 80. The hybrid electric vehicle control unit 80 may be referred to as an "HEY-CU 80" hereinafter.

The HEY-CU 80 may include components such as a microprocessor, an electrically erasable and programmable read-only memory (EEPROM), a random-access memory (RAM), a backup RAM, or an input-output interface (I/F). The microprocessor may perform arithmetic operation. The EEPROM may hold information such as a program that causes the microprocessor to execute various processes. The RAM may hold various pieces of data such as a result of the arithmetic operation. The backup RAM may hold contents of the stored data.

The HEY-CU 80 may be coupled to various types of sensors including an accelerator pedal sensor 91, a throttle opening sensor 92, a gravity (G) sensor or an acceleration sensor 93, a vehicle speed sensor 94, a rotation number sensor 95, and resolvers 97 and 98. The accelerator pedal sensor 91 may detect a depressed amount of an accelerator pedal. The throttle opening sensor 92 may detect a degree of opening of a throttle valve. The G sensor 93 may detect acceleration in the front-rear direction and in the left-right direction of the vehicle. The vehicle speed sensor 94 may detect speed of the wheel. The rotation number sensor 95 may detect number of rotation of the front drive shaft 60. The resolver 97 may detect number of rotation, that is, rotation speed, of the first motor generator 11. The resolver 98 may detect number of rotation, that is, rotation speed, of the second motor generator 12. In one implementation, each of the resolvers 97 and 98 may serve as a "second obtaining unit".

The HEY-CU 80 may be coupled to an engine control unit 81, a vehicle dynamic control unit 85, and any other unit, via a controller area network (CAN) (registered trademark) 70 in a mutually communicable manner. The engine control unit 81 may control the engine 10. The engine control unit 81 may be referred to as an "ECU 81" hereinafter. The vehicle dynamic control unit 85 may improve traveling stability by suppressing a skid of the vehicle, for example. The vehicle dynamic control unit 85 may be referred to as a "VDCU 85" hereinafter. The HEY-CU 80 may receive various pieces of information such as actual number of rotation of the engine 10 and a brake operation amount, from a unit such as the ECU 81 or the VDCU 85 via the CAN 70. The HEY-CU 80 may transmit various pieces of information such as the number of rotation, that is, the rotation speed, of each of the first motor generator 11 and the second motor generator 12, to the ECU 81 via the CAN 70.

The HEY-CU 80 may generally control driving of the engine 10, the second motor generator 12, and the first motor generator 11, on the basis of these obtained various pieces of information. The HEY-CU 80 may calculate a request output of the engine 10 and a torque command value of each of the second motor generator 12 and the first motor generator 11, on the basis of factors such as a degree of opening of the accelerator pedal, which reflects drive force requested by a driver, a driving state of the vehicle, and a state-of-charge (SOC) of a high voltage battery 90. The high voltage battery 90 may also be simply referred to as a "battery 90" hereinafter. The HEY-CU 80 may output results of the calculation described above.

A power control unit 82 may drive the second motor generator 12 and the first motor generator 11 via an inverter 82a, on the basis of the torque command values described above. The power control unit 82 may be referred to as a "PCU 82" hereinafter. The PCU 82 may have the inverter 82a that supplies electric power to the second motor generator 12 and the first motor generator 11 by converting direct-current power from the high voltage battery 90, into three-phase alternating current power. As described above, the PCU 82 may drive the second motor generator 12 and the first motor generator 11 via the inverter 82a on the basis of the torque command values, which are received from the HEY-CU 80. The inverter 82a may convert alternating-current voltage, which is generated by the second motor generator 12, into direct-current voltage to charge the high voltage battery 90 upon regenerating.

The ECU 81 may adjust, for example, a degree of opening of an electronic throttle valve 113 on the basis of the request output described above. Next, configurations of the misfire determination apparatus 1 and the engine 10 applied with the misfire determination apparatus 1 are described in detail with reference to FIG. 2.

The engine 10 may be any type of engine. For example, the engine 10 may be a horizontally-opposed four-cylinder gasoline engine. In one example, the engine 10 may be a direct-injection engine that directly injects fuel into a cylinder. In the engine 10, air may be taken in from an air cleaner 116 and may be reduced by the electronic throttle valve 113 that is provided to an intake pipe 115. The reduced air may pass through an intake manifold 111 into each cylinder that is provided to the engine 10. The electronic throttle valve 113 may be simply referred to as a "throttle valve 113" hereinafter. The amount of the air taken in from the air cleaner 116 may be detected by an air flow meter 114 that is interposed between the air cleaner 116 and the throttle valve 113. The intake manifold 111 may have a collector, which may also be referred to as a surge tank. The collector may be provided with a vacuum sensor 130 that detects pressure inside the intake manifold 111, that is, an intake manifold pressure. The throttle valve 113 may be provided with the throttle opening sensor 92 that measures a degree of opening of the throttle valve 113.

Each of the cylinder may have a cylinder head that is provided with an intake port 122 and an exhaust port 123. FIG. 2 illustrates only one bank. The intake port 122 of each of the cylinders may be provided with an intake valve 124 that opens and closes the intake port 122. The exhaust port 123 of each of the cylinders may be provided with an exhaust valve 125 that opens and closes the exhaust port 123. The intake valve 124 may be driven by using an intake cam shaft and an intake cam pulley that have a variable valve timing mechanism 126 disposed therebetween. The variable valve timing mechanism 126 may continuously vary a rotation phase or a displacement angle of the intake cam shaft relative to the crank shaft 10a by relatively rotating the intake cam shaft and the intake cam pulley, to cause valve opening-and-closing timing of the intake valve 124 to be advanced or retarded. The variable valve timing mechanism 126 may variably set the opening-and-closing timing of the intake valve 124 in accordance with an operating state of the engine 10.

Similarly, the exhaust valve 125 may be driven by using an exhaust cam shaft and an exhaust cam pulley that have a variable valve timing mechanism 127 disposed therebetween. The variable valve timing mechanism 127 may continuously vary a rotation phase or a displacement angle of the exhaust cam shaft relative to the crank shaft 10a by relatively rotating the exhaust cam shaft and the exhaust cam pulley, to cause valve opening-and-closing timing of the exhaust valve 125 to be advanced or retarded. The variable valve timing mechanism 127 may variably set the opening-and-closing timing of the exhaust valve 125 in accordance with the operating state of the engine 10.

Each of the cylinders of the engine 10 may be attached with an injector 112 that injects fuel into the cylinder. The injector 112 may directly inject fuel, to which pressure is applied by an unillustrated high-pressure fuel pump, into a combustion chamber of the corresponding cylinder.

The cylinder head of each of the cylinders may be attached with a spark plug 117 and an igniter built-in coil 121. The spark plug 117 may ignite an air-fuel mixture. The igniter built-in coil 121 may apply high voltage to the spark plug 117. In each of the cylinders of the engine 10, the air-fuel mixture may be ignited by the spark plug 117 and may be burned. The air-fuel mixture may be a mixture of the intake air and the fuel which is injected by the injector 112. After the air-fuel mixture is burned, exhaust gas may be generated, and the exhaust gas may be discharged through an exhaust pipe 118.

In this example implementation, to prevent interference among the exhaust gases, the exhaust pipe 118 may have a 4-2-1 layout in which a first cylinder (#1) and a second cylinder (#2) are joined and collected, a third cylinder (#3) and a fourth cylinder (#4) are joined and collected, and they are further joined and collected into one part. Alternatively, for example, a 4-1 layout may be employed instead of the 4-2-1 layout.

An air-fuel ratio sensor 119 may be mounted downstream of the collected part of the exhaust pipe 118 but upstream of an exhaust purifying catalyst 120 which will be described later. The air-fuel ratio sensor 119 may be, for example, a linear air-fuel ratio sensor which is abbreviated as a LAF sensor. The LAF sensor may output a signal corresponding to an oxygen concentration and an unburned gas concentration in the exhaust gas, that is, a signal corresponding to an air-fuel ratio of the air-fuel mixture, to enable detection of the air-fuel ratio in a linear manner.

The exhaust purifying catalyst 120 may be provided downstream of the LAF sensor 119. The exhaust purifying catalyst 120 may be a three-way catalyst that oxidizes hydrocarbon (HC) and carbon monoxide (CO) in the exhaust gas and reduces nitrogen oxides (NOx) in the exhaust gas at the same time, to purify such toxic gas components in the exhaust gas into nontoxic components: carbon dioxide ($CO_2$), water vapor ($H_2O$), and nitrogen ($N_2$).

A cam angle sensor 132 may also be mounted in the proximity to the intake cam shaft of the engine 10 in addition to the air flow meter 114, the LAF sensor 119, the vacuum sensor 130, and the throttle opening sensor 92. The cam angle sensor 132 may discriminate between the cylinders of the engine 10. A crank angle sensor 133 may be mounted in the proximity to the crank shaft 10a of the engine 10. The crank angle sensor 133 may detect a rotation position of the crank shaft 10a. For example, the rotation position of the crank shaft 10a may be a rotational angular velocity and number of rotation obtained on the basis of time variation in the rotation position. In one example, a timing rotor 133a may be mounted at an end of the crank shaft 10a, and the timing rotor 133a may have projections of thirty-four teeth with lack of two teeth, which are formed at an interval of 10 degrees. In this case, the crank angle sensor 133 may detect the rotation position of the crank shaft 10a by detecting presence or absence of the protrusions of the teeth of the timing rotor 133a. The cam angle sensor 132 and the crank angle sensor 133 may be electromagnetic pickup sensors, for example. In one implementation, the crank angle sensor 133 may serve as a "first obtaining unit".

The foregoing sensors may be coupled to the ECU 81. The ECU 81 may also be coupled to various types of sensors such as a coolant temperature sensor 134 that detects temperature of a coolant of the engine 10. The ECU 81 may receive information such as the request output, the number of rotation, that is, the rotation speed, of each of the first motor generator 11 and the second motor generator 12, or the degree of opening of the accelerator pedal, from the HEY-CU 80 via the CAN 70.

The ECU 81 may include components such as a microprocessor, an EEPROM, a RAM, a backup RAM, or an I/F. The microprocessor may perform arithmetic operation. The EEPROM may hold information such as a program that causes the microprocessor to execute various processes. The RAM may hold various pieces of data such as a result of the arithmetic operation. The backup RAM may hold contents of the stored data. The ECU 81 may include devices such as an injector driver, an output circuit, or a motor driver. The injector driver may drive the injector 112. The output circuit may output an ignition signal. The motor driver may drive the electric motor 113a that opens and closes the electronic throttle valve 113.

The ECU 81 may discriminate between the cylinders on the basis of output from the cam angle sensor 132 and may calculate the rotational angular velocity and the actual number of rotation of the engine 10 from output from the crank angle sensor 133. The ECU 81 may acquire various pieces of information such as an intake air amount, an intake-pipe negative pressure, an air-fuel ratio of the air-fuel mixture, or a coolant temperature of the engine 10, on the basis of detection signals received from the various types of the sensors described above. On the basis of the request output from the HEY-CU 80 and these acquired various pieces of information, the ECU 81 may control, for example, a fuel injection amount, ignition timing, and various types of devices such as the throttle valve 113, to control the engine 10.

In particular, the ECU 81 may determine misfire at higher accuracy while suppressing an increase in the process load, even when the flywheel damper 20 produces resonance. Therefore, the ECU 81 may include an engine rotation number calculator 81a, a rotation deviation obtaining unit 81b, an average value obtaining unit 81c, and a misfire determination unit 81d. Each operation of the engine rotation number calculator 81a, the rotation deviation obtaining unit 81b, the average value obtaining unit 81c, and the misfire determination unit 81d of the ECU 81 may be implemented by execution of the program by the microprocessor. The program may be stored in storage such as the EEPROM.

The engine rotation number calculator 81a may calculate number of rotation of the engine 10 on the basis of the number of rotation of the first motor generator 11, which is received from the HEY-CU 80, and a total gear ratio between the first motor generator 11 and the engine 10. The number of rotation of the motor may be the number of rotation of the second motor generator 12 instead of that of the first motor generator 11. In the example illustrated in FIG. 1, the total gear ratio may be a gear ratio of the pair of gears 21 and the power distribution mechanism 30, more exactly, the set of the sun gear 30a and the pinion gear 30c. The result may be used as calculated number of rotation of the engine 10. In one example, the calculated number of rotation of the engine 10 may be calculated by the HEY-CU 80 and may be received by the ECU 81 via the CAN 70. In one implementation, the engine rotation number calculator 81a may serve as a "calculator". The calculated number of rotation of the engine 10 may be output to the rotation deviation obtaining unit 81b.

The rotation deviation obtaining unit 81b may obtain a rotation deviation between the actual number of rotation of the engine 10 and the calculated number of rotation of the engine 10. In one implementation, the rotation deviation obtaining unit 81b may serve as a "third obtaining unit". The obtained rotation deviation may be output to the average value obtaining unit 81c.

The average value obtaining unit 81c may calculate a moving average value of the rotation deviation between the actual number of rotation of the engine 10 and the calculated number of rotation of the engine 10 in a predetermined crank angle range or section. The moving average value may also be referred to as a "rotation deviation average value". In one implementation, the average value obtaining unit 81c may serve as a "fourth obtaining unit". The interval in the predetermined crank angle for obtaining the moving average, that is, the number of data, may be set in accordance with a resonance frequency of the flywheel damper 20. In one example, the interval in the predetermined crank angle, that is, the number of data, may be made greater as the actual number of rotation of the engine 10 increases. This is because, whereas an ignition interval or an ignition time may vary with variation in the number of rotation of the engine 10, a resonance frequency may not vary, whereby number of ignition, that is, the number of data, which is necessary for absorbing a resonance wave, may vary. The calculated moving average value of the rotation deviation may be output to the misfire determination unit 81d.

The misfire determination unit 81d may subtract the moving average value of the rotation deviation from the rotation deviation to obtain a subtracted rotation deviation. The misfire determination unit 81d may determine that the engine 10 is misfiring in a case where the subtracted rotation deviation exceeds a determination threshold. In one implementation, the misfire determination unit 81d may serve as a "determination unit". In one example, the misfire determination unit 81d may execute the misfire determination described above in an engine rotation number range that allows for resonance of the flywheel damper 20. For example, the engine rotation number range described above may be from 1500 rpm to 2500 rpm.

The determination threshold for determining the misfire may be specified in accordance with, for example, the actual number of rotation of the engine 10 and an engine load, to appropriately determine the misfire. The engine load may be calculated from the intake air amount, for example. This is because the rotation deviation may vary with variation in the actual number of rotation of the engine 10 due to an influence of inertial force, and a variation amount at the time of misfire may vary with variation in output torque of the engine 10. The EEPROM of the ECU 81 or any other component may hold a map in which a relationship between the actual number of rotation of the engine 10, the engine load such as the intake air amount, and the determination threshold is stored. The map may be referred to as a "determination threshold map". The misfire determination unit 81*d* may retrieve a determination threshold from the determination threshold map by using the actual number of rotation of the engine 10 and the engine load such as the intake air amount.

The determination threshold may be subjected to a coolant temperature-based correction to be corrected in accordance with the coolant temperature of the engine 10, in order to prevent erroneous determination. This is because, in a cold state, atomization of the fuel may be reduced, and an amount of burning may be reduced, whereby the actual number of rotation of the engine 10 may prone to vary. Moreover, to prevent erroneous determination, in one example, the misfire determination unit 81*d* may provide a predetermined delay period before resuming execution of the misfire determination when the engine 10 is restarted after the engine 10 is temporarily stopped. For example, the engine 10 may be restarted after fuel cut is performed or the engine 10 is stopped to prevent idling. This is because a burning state may tend to be unstable, resulting in increase in the rotation deviation, for example, immediately after the engine 10 recovers from the fuel cut state.

The misfire determination unit 81*d* may count up a counter value by which the number of the misfire determination is counted, each time the engine 10 is determined as being misfiring. The misfire determination unit 81*d* may judge the state of the misfire as being in an abnormal state when the counter value reaches a predetermined value.

In one example, the misfire determination unit 81*d* may finally determine misfire of the engine 10 in a case where the engine 10 is determined as being misfiring by one or both of determination methods. One of the determination methods may be, as described above, that the engine 10 is determined as being misfiring when the subtracted rotation deviation exceeds the determination threshold. The other determination method may be that the engine 10 is determined as being misfiring when a difference between the actual number of rotation of the engine 10 at a crank angle corresponding to ignition timing and the actual number of rotation of the engine 10 at a crank angle a predetermined crank angle (CA) before the crank angle corresponding to the ignition timing, that is, variation in rotation of the engine 10, exceeds a predetermined threshold. The predetermined crank angle may be an angle at 180, 360, or 720 degrees CA, for example.

Figure 3:
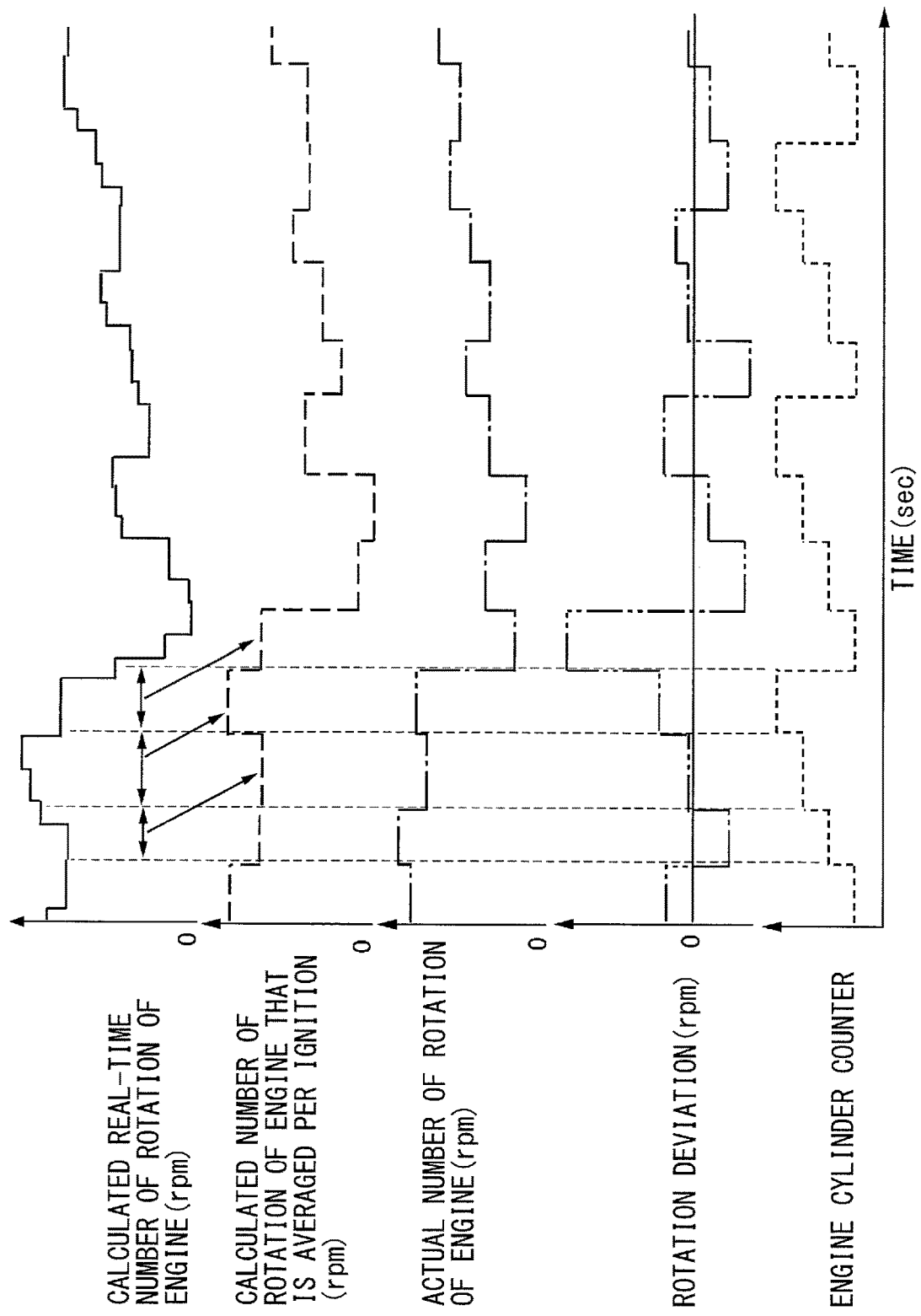
FIG. 3 is a first diagram for explaining an example of a misfire determination process performed by the misfire determination apparatus according to one implementation.
Figure 4:
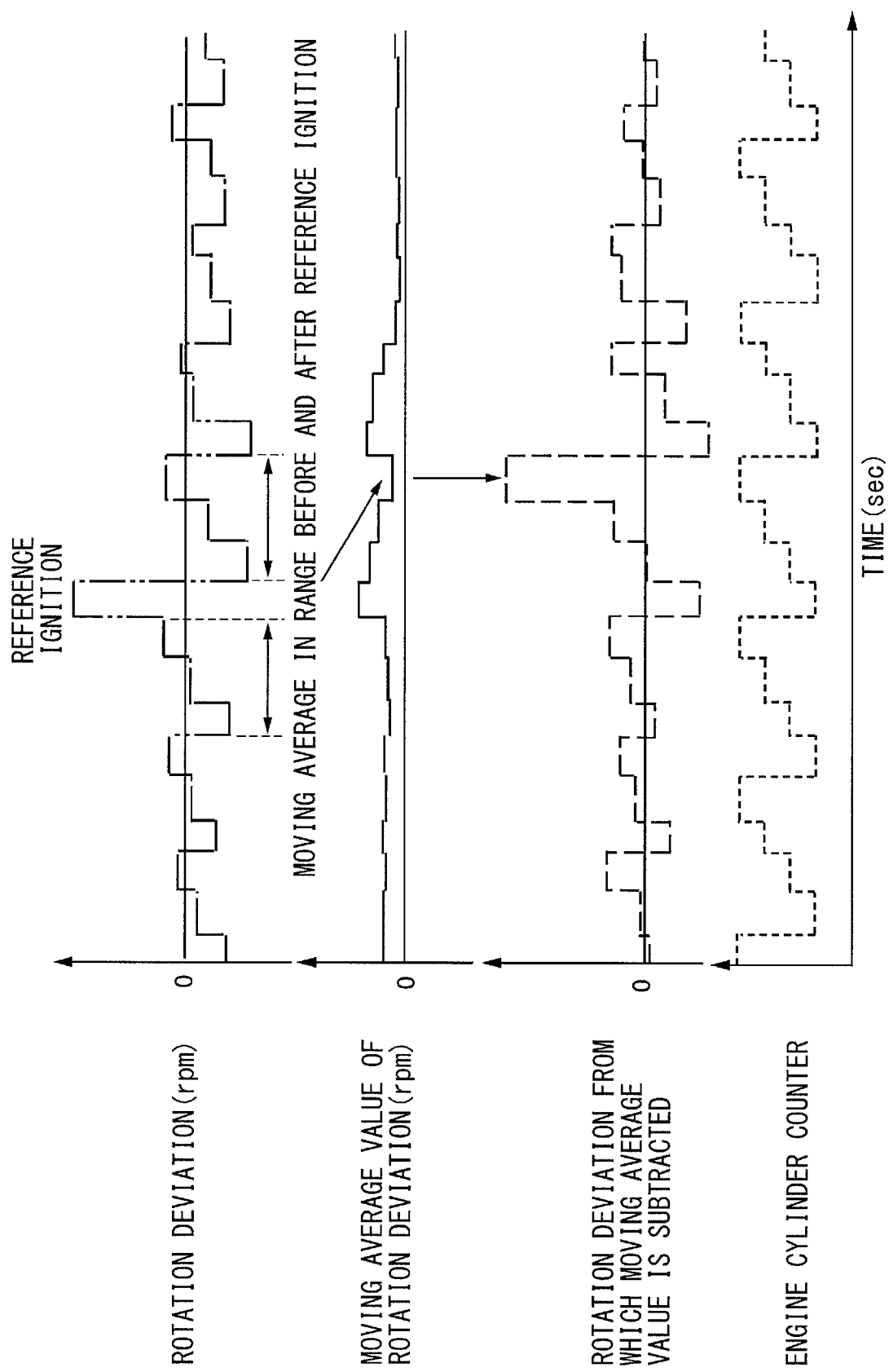
FIG. 4 is a second diagram for explaining an example of the misfire determination process performed by the misfire determination apparatus according to one implementation.
Figure 5:
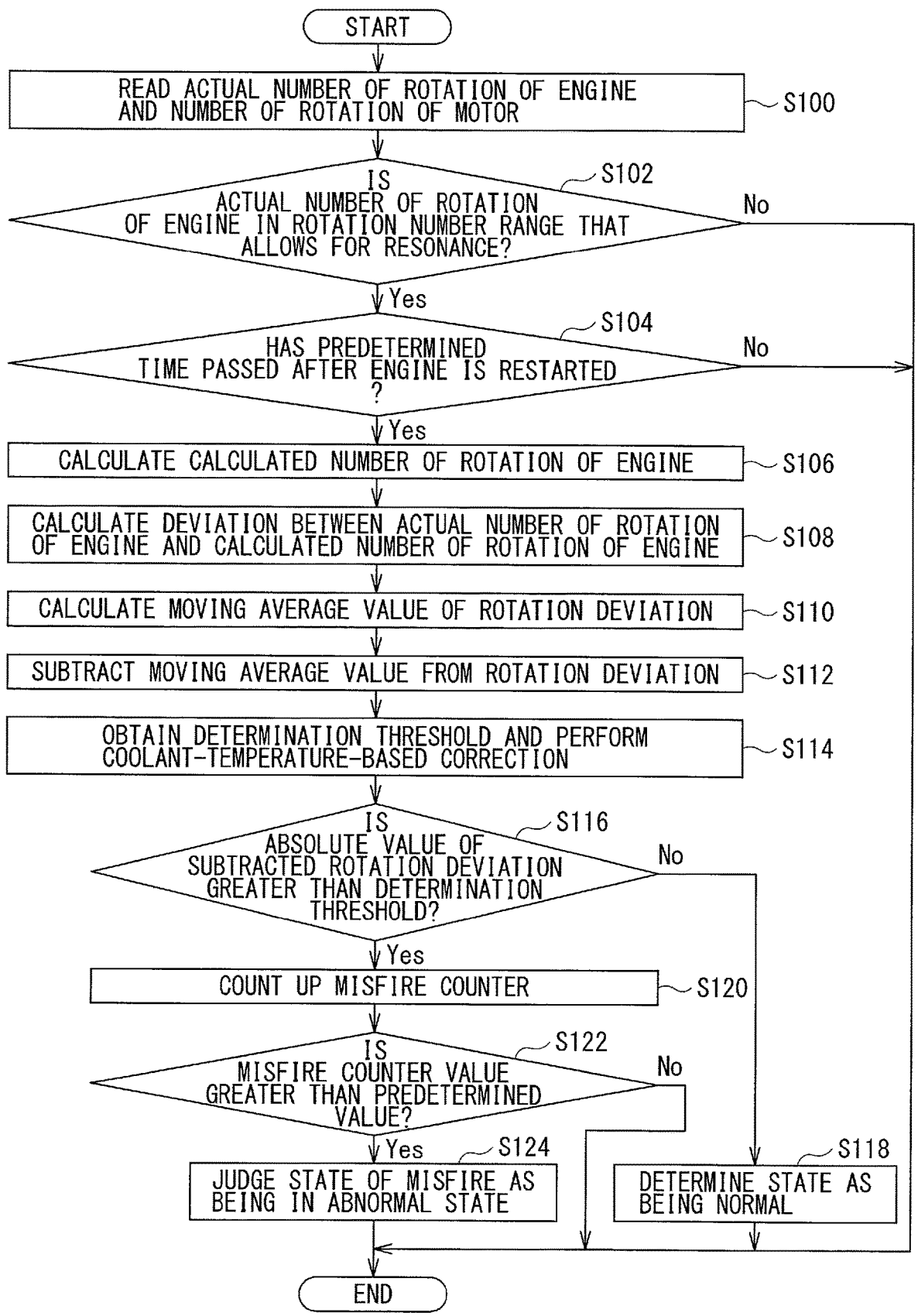
FIG. 5 is a flowchart illustrating an example of a process procedure of the misfire determination process performed by the misfire determination apparatus according to one implementation.

A description is given next of operation of the misfire determination apparatus 1 with reference to FIGS. 3 to 5. FIGS. 3 and 4 are first and second diagrams for explaining the misfire determination performed by the misfire determination apparatus 1. FIG. 3 illustrates a horizontal axis that represents time and illustrates a vertical axis that represents calculated real-time number of rotation of the engine 10 (rpm), the calculated number of rotation of the engine 10 that is averaged per ignition (rpm), actual number of rotation of the engine 10 (rpm), the rotation deviation (rpm), and an engine cylinder counter, in this order from the top. Similarly, FIG. 4 illustrates a horizontal axis that represents time and illustrates a vertical axis that represents the rotation deviation (rpm), the moving average value of the rotation deviation (rpm), the rotation deviation from which the moving average value is subtracted (rpm), and an engine cylinder counter, in this order from the top. The engine cylinder counter may be a counter that counts up to perform increment of number at each ignition timing of the engine 10 and represents the number of the cylinder by which the ignition is performed. For example, the engine cylinder counter may count up the number per each 180 degrees CA in a case of a four-cylinder engine. FIG. 5 is a flowchart illustrating a process procedure of the misfire determination process performed by the misfire determination apparatus 1. This process may be repeatedly executed at predetermined timing mainly by the ECU 81.

First, the actual number of rotation of the engine 10 and the number of rotation of the motor may be read in step S100 in FIG. 5. Thereafter, in step S102, whether the actual number of rotation of the engine 10 is in the engine rotation number range that allows for resonance of the flywheel damper 20 may be determined. For example, the engine rotation number range may be from 1500 rpm to 2500 rpm. When the actual number of rotation of the engine 10 is in the engine rotation number range that allows for resonance, the process may advance to step S104. Otherwise, when the actual number of rotation of the engine 10 is not in the engine rotation number range that allows for resonance, the process may be once brought to an end.

In step S104, whether time has passed beyond a predetermined time after the engine 1 is restarted may be determined. When time has passed beyond the predetermined time, the process may advance to step S106. Otherwise, when time has not passed beyond the predetermined time, the process may be once brought to an end.

In step S106, first, the calculated real-time number of rotation of the engine 10 may be calculated from the real-time number of rotation of the first motor generator 11 and from the total gear ratio between the first motor generator 11 and the engine 10. An example of the result may be illustrated by a solid line in the first line in FIG. 3. The calculated real-time number of rotation of the engine 10 may be synchronized with the engine cylinder counter to be averaged per ignition of the engine 10, whereby the calculated number of rotation of the engine 10 to be used in the misfire determination is obtained. For example, the calculated real-time number of rotation of the engine 10 may be averaged per 180 degrees CA in a case of a four-cylinder engine. An example of the result may be illustrated by a dashed line in the second line in FIG. 3. Similarly, the real-time actual number of rotation of the engine 10 may be synchronized with the engine cylinder counter to be averaged per ignition of the engine 10, whereby the actual number of rotation of the engine to be used in the misfire determination is obtained. For example, the real-time actual number of rotation of the engine 10 may be averaged per 180 degrees CA in a case of a four-cylinder engine. An example of the result may be illustrated by an alternate long and short dash line in the third line in FIG. 3.

Thereafter, in step S108, a deviation between the actual number of rotation of the engine 10 and the calculated number of rotation of the engine 10 which are calculated in step S106 may be obtained. Examples of the result may be illustrated by an alternate long and two short dash line in the fourth line in FIG. 3 and in the first line in FIG. 4. Thereafter, in step S110, the moving average value of the rotation deviation in the predetermined crank angle range or section may be calculated. The moving average value may represent an average of difference between rotation that is generated on one side of the flywheel damper 20 and rotation that is generated on the other side of the flywheel damper 20. An example of the result may be illustrated by a solid line in the second line in FIG. 4. For example, as illustrated in FIG. 4, the moving average value in a section before and after reference ignition may be calculated. In the example illustrated in FIG. 4, the section may include three points before and after the reference ignition, which is 1260 degrees CA.

Thereafter, in step S112, the moving average value of the rotation deviation, which is calculated in step S110, may be subtracted from the rotation deviation to obtain the subtracted rotation deviation. An example of the result may be illustrated by a dashed line in the third line in FIG. 4. Thereafter, in step S114, the determination threshold may be retrieved from the determination threshold map by using the actual number of rotation of the engine 10 and the engine load such as the intake air amount. Moreover, in step S114, the retrieved determination threshold may be subjected to the coolant temperature-based correction in accordance with the coolant temperature.

Thereafter, in step S116, whether an absolute value of the subtracted rotation deviation is greater than the corrected determination threshold may be determined. When the absolute value of the subtracted rotation deviation is the corrected determination threshold or smaller, it may be determined as being in a normal state in step S118, and the process may be once brought to an end. Otherwise, when the absolute value of the subtracted rotation deviation is greater than the corrected determination threshold, the process may advance to step S120.

In step S120, the counter value by which the number of the misfire determination is counted may be counted up to perform increment thereof. Thereafter, in step S122, whether the counter value reaches a predetermined value may be determined. When the counter value does not reach the predetermined value, the process may be once brought to an end. Otherwise, when the counter value reaches the predetermined value, it may be judged that the state of the misfire is in an abnormal state in step S124, and the process may be brought to an end thereafter.

Thus, the misfire determination may be performed. As described above, in one example, it may be finally determined that the engine 10 is misfiring in a case where the engine 10 is determined as being misfiring by one or both of the determination methods. One of the determination methods may be that the engine 10 is determined as being misfiring when the subtracted rotation deviation exceeds the determination threshold. The other determination method may be that the engine 10 is determined as being misfiring when the difference between the actual number of rotation of the engine 10 at the crank angle at the ignition timing and the actual number of rotation of the engine 10 at the crank angle the predetermined crank angle before the crank angle corresponding to the ignition timing, that is, variation in rotation of the engine 10, exceeds the predetermined threshold. The predetermined crank angle may be an angle at 180, 360, or 720 degrees CA, for example.

As described in detail above, according to this example implementation, the actual number of rotation, that is, the rotation speed, of the engine 10, and the number of rotation, that is, the rotation speed, of the motor may be obtained. Further, the calculated number of rotation of the engine 10 may be calculated on the basis of the number of rotation of the motor and the total gear ratio between the first motor generator 11 and the engine 10. Thereafter, the rotation deviation between the actual number of rotation of the engine 10 and the calculated number of rotation of the engine 10 may be obtained. The engine 10 may be determined as being misfiring in a case where the rotation deviation exceeds the determination threshold. That is, the actual number of rotation of the engine 10, which is directly obtained, and the calculated number of rotation of the engine 10, which is calculated from the number of rotation of the first motor generator 11 that is provided downstream of the flywheel damper 20, may be compared with each other to obtain a deviation. This enables extraction of only the rotation deviation caused by decrease in the torque of the engine 10 due to misfire. As a result, it is possible to determine misfire at higher accuracy while suppressing an increase in the process load, even when the flywheel damper 20 produces resonance.

In particular, according to this example implementation, the moving average value of the rotation deviation in the predetermined crank angle range or section may be calculated, and the subtracted rotation deviation may be obtained by subtracting the moving average value from the rotation deviation. In a case in which the subtracted rotation deviation exceeds the determination threshold, the engine 10 may be determined as being misfiring. That is, first, the rotation deviation between the actual number of rotation of the engine 10 and the calculated number of rotation of the engine 10 may be averaged in the predetermined crank angle range to obtain the moving average value, whereby a latent offset between the actual number of rotation of the engine 10 and the calculated number of rotation of the engine 10 may be calculated. The moving average value that represents the latent offset may be subtracted from the rotation deviation, whereby the subtracted rotation deviation, that is, the real-time rotation deviation may be calculated. The elimination of the latent offset from the rotation deviation between the actual number of rotation of the engine 10 and the calculated number of rotation of the engine 10 enables extraction of variation in rotation which suddenly occurs as in the case of misfire. Thus, it is possible to determine misfire at a higher accuracy also in the resonance range.

According to this example implementation, the interval in the predetermined crank angle or the predetermined crank angle section may be set in accordance with the resonance frequency of the flywheel damper 20. This enables more appropriate calculation of the latent offset between the actual number of rotation of the engine 10 and the calculated number of rotation of the engine 10.

According to this example implementation, the determination threshold may be specified in accordance with the actual number of rotation of the engine 10 and the engine load, whereby it is possible to more appropriately set the determination threshold.

The amount of burning in the engine 10 may tend to be reduced in a cold state. Even in such a situation, this example implementation enables more accurate misfire determination while preventing erroneous determination by using the determination threshold that is corrected in accordance with the coolant temperature.

The state of burning may tend to be relatively unstable immediately after the engine 10 is restarted. Nevertheless, this example implementation enables preventing of erroneous determination because a delay period is set in the case of restarting the engine 10.

Moreover, according to this example implementation, the misfire determination may be executed in the engine rotation number range that allows for resonance of the flywheel damper 20. Therefore, it is possible to provide a configuration that executes the misfire determination described above only in the resonance range of the flywheel damper 20, which is the engine rotation number range that allows for resonance, thereby further suppressing an increase in the process load.

According to this example implementation, the final misfire determination may be performed by combining the two determination methods. One of the determination methods may be a method of performing the misfire determination on the basis of the rotation deviation between the engine 10 and the first motor generator 11. The other determination method may be a method of performing the misfire determination on the basis of the variation in rotation of the engine 10. This improves accuracy of the misfire determination in an entire operation range, that is, also in a range other than the resonance range of the torsion element.

Moreover, according to this example implementation, the counter value by which the number of the misfire determination is counted may be counted up each time the engine 10 is determined as being misfiring. It may be judged that the state of the misfire is in an abnormal state when the counter value reaches the predetermined value. This prevents erroneous determination and enables judging the state of the misfire as being in the abnormal state when the degree of the misfire reaches a degree at which the misfire may adversely affect the exhaust emissions.

According to one implementation of the technology, it is possible, in a hybrid electric vehicle in which an engine is coupled to axel side via a torsion element, to perform accurate determination of misfire while suppressing an increase in a process load even when the torsion element produces resonance.

Although some example implementations of the technology have been described in the foregoing, the technology is by no means limited to the example implementations described above and is variously modifiable. For example, in the foregoing example implementation, a case of applying the misfire determination apparatus 1 according to one example implementation of the technology to a series-parallel hybrid electric vehicle (HEV) is exemplified. However, the misfire determination apparatus 1 may also be applied to a different type of hybrid electric vehicle such as a parallel hybrid electric vehicle or a plug-in hybrid electric vehicle (PHEV) that is chargeable from the outside. The forgoing example implementation may include two electric motors, that is, the first motor generator 11 and the second motor generator 12. However, the number of the electric motors is not limited to two, and one motor, or three or more motors, may be provided. Similarly, the configuration of the driving system including the multiple gears and the shaft may not be limited to the configuration of the foregoing example implementation.

Although a case of applying the misfire determination apparatus 1 according to one example implementation of the technology to the four-cylinder engine may be exemplified in the foregoing example implementation, the technology is not limited to the four-cylinder engine and may be applied to any engine. Moreover, one implementation of the technology is not limited to a horizontally-opposed engine and may also be applied to any engine such as an in-line engine or a V-type engine. Similarly, although a case of applying one implementation of the technology to a direct-injection engine is exemplified in the forgoing example implementation, one implementation of the technology may also be applied to any engine such as a port-injection engine.

The system configurations of the controllers such as the HEV-CU 80 or the ECU 81, and allocation of the operation of each of the controllers may not be limited to those described in the foregoing example implementations.

Although a case of applying one implementation of the technology to an AWD vehicle is exemplified in the foregoing example implementations, one implementation of the technology may also be applied to, for example, a two-wheel drive (2WD) vehicle such as a front-wheel drive (FF) vehicle or a rear-wheel drive (FR) vehicle.

Each of the ECU 81, the engine rotation number calculator 81a, the rotation deviation obtaining unit 81b, the average value obtaining unit 81c, and the misfire determination unit 81d illustrated in FIG. 1 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of each of the ECU 81, the engine rotation number calculator 81a, the rotation deviation obtaining unit 81b, the average value obtaining unit 81c, and the misfire determination unit 81d illustrated in FIG. 1. Such a medium may take many forms, including, but not limited to, any type of magnetic medium such as a hard disk, any type of optical medium such as a CD and a DVD, any type of semiconductor memory (i.e., semiconductor circuit) such as a volatile memory and a nonvolatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of each of the ECU 81, the engine rotation number calculator 81a, the rotation deviation obtaining unit 81b, the average value obtaining unit 81c, and the misfire determination unit 81d illustrated in FIG. 1.

Although some implementations of the technology have been described in the foregoing by way of example with reference to the accompanying drawings, the technology is by no means limited to the implementations described above. It should be appreciated that modifications and alterations may be made by persons skilled in the art without departing from the scope as defined by the appended claims. The technology is intended to include such modifications and alterations in so far as they fall within the scope of the appended claims or the equivalents thereof.

The invention claimed is:

1. A misfire determination apparatus comprising:
   a first obtaining unit configured to obtain actual engine rotation number, the actual engine rotation number being actual number of rotation of an engine in a hybrid electric vehicle, the engine being coupled to side of an axle via a torsion element in the hybrid electric vehicle, the axle being coupled to an electric motor in a torque transmittable manner in the hybrid electric vehicle;
   a second obtaining unit configured to obtain motor rotation number, the motor rotation number being number of rotation of the electric motor;
   a calculator configured to calculate calculated engine rotation number on a basis of the motor rotation number and a total gear ratio between the electric motor and the engine, the calculated engine rotation number being calculated number of the rotation of the engine;
   a third obtaining unit configured to obtain a rotation deviation between the actual engine rotation number and the calculated engine rotation number; and a determination unit configured to execute misfire determination of the engine by determining the engine as being misfiring when the rotation deviation exceeds a determination threshold.

2. The misfire determination apparatus according to claim 1, further comprising
a fourth obtaining unit configured to calculate an average value of the rotation deviation in a predetermined crank angle range, wherein
the determination unit is configured to subtract the average value from the rotation deviation to obtain a subtracted rotation deviation, and
the determination unit is configured to execute the misfire determination of the engine by performing a deviation-based determination process that determines the engine as being misfiring when the subtracted rotation deviation exceeds the determination threshold.

3. The misfire determination apparatus according to claim 2, wherein the predetermined crank angle range is set in accordance with a resonance frequency of the torsion element.

4. The misfire determination apparatus according to claim 2, wherein the determination threshold is determined in accordance with the actual engine rotation number and an engine load of the engine.

5. The misfire determination apparatus according to claim 3, wherein the determination threshold is determined in accordance with the actual engine rotation number and an engine load of the engine.

6. The misfire determination apparatus according to claim 2, wherein the determination threshold is corrected in accordance with temperature of a coolant of the engine.

7. The misfire determination apparatus according to claim 3, wherein the determination threshold is corrected in accordance with temperature of a coolant of the engine.

8. The misfire determination apparatus according to claim 2, wherein the determination unit is configured to provide a delay period until resuming the misfire determination of the engine when the engine is restarted after the engine is temporarily stopped.

9. The misfire determination apparatus according to claim 3, wherein the determination unit is configured to provide a delay period until resuming the misfire determination of the engine when the engine is restarted after the engine is temporarily stopped.

10. The misfire determination apparatus according to claim 2, wherein the determination unit is configured to execute the misfire determination of the engine in an engine rotation number range that allows for resonance of the torsion element.

11. The misfire determination apparatus according to claim 3, wherein the determination unit is configured to execute the misfire determination of the engine in an engine rotation number range that allows for resonance of the torsion element.

12. The misfire determination apparatus according to claim 2, wherein
the determination unit is configured to perform, in addition to the deviation-based determination process, a rotation-number-based determination process by determining the engine as being misfiring when a difference exceeds a predetermined threshold, the deference being a difference between the actual engine rotation number at a crank angle corresponding to ignition timing of the engine and the actual engine rotation number at a crank angle that is a predetermined crank angle before the crank angle corresponding to the ignition timing of the engine, and
the determination unit is configured to finally determine the engine as being misfiring when the engine is determined as being misfiring in one or both of the deviation-based determination process and the rotation-number-based determination process.

13. The misfire determination apparatus according to claim 3, wherein
the determination unit is configured to perform, in addition to the deviation-based determination process, a rotation-number-based determination process by determining the engine as being misfiring when a difference exceeds a predetermined threshold, the deference being a difference between the actual engine rotation number at a crank angle corresponding to ignition timing of the engine and the actual engine rotation number at a crank angle that is a predetermined crank angle before the crank angle corresponding to the ignition timing of the engine, and
the determination unit is configured to finally determine the engine as being misfiring when the engine is determined as being misfiring in one or both of the deviation-based determination process and the rotation-number-based determination process.

14. The misfire determination apparatus according to claim 2, wherein
the determination unit is configured to count up a counter value by which number of the misfire determination is counted, each time when the engine is determined as being misfiring, and
the determination unit is configured to judge that the misfiring of the engine is in an abnormal state, when the counter value reaches a predetermined value.

15. The misfire determination apparatus according to claim 3, wherein
the determination unit is configured to count up a counter value by which number of the misfire determination is counted, each time when the engine is determined as being misfiring, and
the determination unit is configured to judge that the misfiring of the engine is in an abnormal state, when the counter value reaches a predetermined value.

16. A misfire determination apparatus comprising:
a first obtaining unit configured to obtain actual engine rotation number, the actual engine rotation number being actual number of rotation of an engine in a hybrid electric vehicle, the engine being coupled to side of an axle via a torsion element in the hybrid electric vehicle, the axle being coupled to an electric motor in a torque transmittable manner in the hybrid electric vehicle;
a second obtaining unit configured to obtain motor rotation number, the motor rotation number being number of rotation of the electric motor; and
circuitry configured to
calculate calculated engine rotation number on a basis of the motor rotation number and a total gear ratio between the electric motor and the engine, the calculated engine rotation number being calculated number of the rotation of the engine,
obtain a rotation deviation between the actual engine rotation number and the calculated engine rotation number, and execute misfire determination of the engine by determining the engine as being misfiring when the rotation deviation exceeds a determination threshold.

* * * * *